(12) United States Patent
Chen et al.

(10) Patent No.: US 6,209,403 B1
(45) Date of Patent: Apr. 3, 2001

(54) APPARATUS FOR MEASURING POSITIVELY-SENSED FORCE OF AN ELECTRICAL CONNECTOR (2)

(75) Inventors: Li-Sen Chen, Kaohsiung; Hung-Ju Yen, Hsinchu; Yen-Jang Liao, Yun Lin; Wei-Tai Jao, Hsinchu, all of (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/204,009

(22) Filed: Dec. 1, 1998

(51) Int. Cl.[7] ................................................. G01L 1/04
(52) U.S. Cl. ................................ 73/862.627; 73/82
(58) Field of Search ......................... 73/161, 775, 812, 73/849, 852, 856, 862.391, 862.621, 862.627

(56) References Cited

U.S. PATENT DOCUMENTS

| | | | |
|---|---|---|---|
| 3,969,935 | * | 7/1976 | Shoberg ................................ 73/141 |
| 4,038,867 | * | 8/1977 | Andrews et al. .................... 73/775 |
| 4,294,015 | * | 10/1981 | Drouin et al. ....................... 73/831 |
| 4,380,171 | | 4/1983 | Smith .................................. 73/161 |
| 5,313,022 | * | 5/1994 | Piroozmandi et al. .............. 177/211 |
| 5,578,754 | * | 11/1996 | Kato et al. ......................... 73/504.12 |

FOREIGN PATENT DOCUMENTS 245634   4/1995 (TW) .

* cited by examiner

Primary Examiner—Max Noori

(74) Attorney, Agent, or Firm—Merchant & Gould P.C.

(57) ABSTRACT

Disclosed in an apparatus for measuring positively-sensed force of an electrical connector, comprising: a base plate; at least one L-shaped pads, the two L-shaped pads being each affixed to the base plate at an upper end thereof in such an arrangement that ends thereof oppose each other; an elastically deformable sheet provided between the two L-shaped pads, the elastically deformable sheet being affixed to the base plate and formed with a projective measuring region at end thereof; and at least one strain gauge inertly affixed to the elastically deformable sheet, the strain gauge beingconnected to a signal transmitting device that outputs strain value of the strain gauge to a signal amplifying device for display purpose in response to deformation of the elastically deformable sheet. While implementing this invention in measuring positively-sensed clamping force of terminals of an electrical connector, bottom ends of the two L-shaped pads and the projective measuring region of the elastically deformable sheet are inserted between the connector terminals. Since the two L-shaped pads each have a thickness being equal to a thickness of a circuit board into which terminals are inserted and accommodating width of the connector terminals, and since the circuit board has a thickness being less than the thickness of the two L-shaped pads and a transverse gap formed between the connector terminals, the elastically deformable sheet is thus deformed while experiencing lateral pressure exerted by the connector terminals. Strain of the deformed sheet is thus measured by the strain gauges provided thereon. Strain signals are transmitted to the signal amplifying device through the signal transmitting device to acquire the positively-sensed clamping force of the connector terminals effected to the circuit board.

8 Claims, 2 Drawing Sheets

APPARATUS FOR MEASURING POSITIVELY-SENSED FORCE OF AN ELECTRICAL CONNECTOR (2)

FIELD OF INVENTION

This invention relates to an apparatus for measuring positively-sensed force of an electrical connector, in particular to a device that provides at least one strain gauge on an elastically deformable sheet. In the device deformation of the elastically deformable sheet to which the strain gauge attaches, serves as a measure for measuring strain of the sheet and for acquiring the positively-sensed clamping force of the connector terminals.

BACKGROUND OF INVENTION

In engineering an electrical connector, electrical connector terminals must consist of positively-sensed clamping force of a certain amplitude in order to rub off oxides or sulfides of contact surfaces between a circuit board and the terminals thereby attaining acceptable conductive effects, maintaining sufficient contact area between the circuit board and the connector, and preventing fretting corrosion failure due to vibration. On the other hand, if other factors, such as wear reduction, spring rigidity and stability, are taken into account in engineering the connector, the positively-sensed clamping force of the electrical connector terminals effecting to the circuit board is preferred to be minimized so as to optimize connector performance. Therefore, how to maintain an appropriate positively-sensed clamping force being effected to the circuit board is an important engineering issue being intensively observed while engineering new electrical connectors or modifying existing electrical connectors. Because amplitude of the positively-sensed clamping force that an electrical connector effects to a circuit board will eventually affect connector reliability and force required for inserting or withdrawing the connector into or from the circuit board, manufactures of electrical connectors have given much consideration to the amplitude of clamping force while engineering electrical connectors. However, apparatus for measuring positively-sensed clamping force of an electrical connector is currently unavailable in the commercial market, where most of the time, connectors are split apart such that positively-sensed clamping force is measured by conducting tensile test thereto. The majority of manufactures also rely on past experiences, repetitive experiments and design modifications attain the desired positively-sensed clamping force. It is sometimes necessary to rely on the customers to evaluate whether the ultimate positively-sensed clamping force that the electrical connectors effect to the circuit board qualifies the customers' specifications. The only prior art known so far involves U.S. Pat. No. 4,380,171 issued on Apr. 19, 1983. Hence, manufacturers of electrical connectors in general cost considerable experimental or trial-run expenditures and take an extended engineering term to attain the desired connectors, where such an engineering approach is obviously disadvantageous to the manufacturers in contending orders and in product manufacturing.

Currently, amplitude of the positively-sensed force of an electrical connector is obtained through two measures, including analysis and experimentation, wherein the method of analysis mostly involves finite element analysis, from which the overall stress distribution and the positively-sensed clamping force of the electrical connector can be calculated. However, since in such a method numeral results are derived from specific mathematical modes, it is essential to select proper modes and to modify the results based on existent conditions in order to attain correct values. Thus, implementation of the method of analysis still relies on actual measurements of the positively-sensed force to verify the results of the finite elements analysis, to serve as a reference for modifying the analysis modes, and to help engineers who design the electrical connector to acquire feeling for the amplitude of the positively-sensed force. Therefore, taking actual measurements of the positively-sensed force is an extremely vital technique in engineering electrical connectors.

In addition, recent development of electronic industry has gradually reduced thickness of common circuit boards down to approximately 1 mm, or even thinner; compact and high density designs are thus trends that electrical connectors must follow, which trends eventually result in reduction of terminal volume and intensify difficulty for measuring the positively-sensed force of such miniature products. Most researches related to taking actual measurements of positively-sensed clamping force of electrical connector terminals being conducted by research teams, are still in the conception stage. It is to the applicant's knowledge that commercial products that are equipped with such functions are currently unavailable in the market

SUMMARY OF INVENTION AND RELEVANT PRIOR ART

It is a primary object of this invention to provide an apparatus for measuring positively-sensed force of an electrical connector, such that manufacturers of electrical connectors may conveniently, and easily measure the positively-sensed clamping force of their connector products effecting to circuit boards.

Conventional. technology implemented in this invention includes utilization of a resistive strain gauge being attached to a surface of a deformable article and conversion of resistance variation of the strain gauge into voltage variation (i.e., signal outputs), where such concepts are similar to those being implemented in the load sensor of implant bones disclosed in the allowed ROC (Taiwan) Pat. Pub. No. 245634 which was filed by the same Applicant on Sep. 24, 1993 and published on Apr. 21, 1995 for ROC (Taiwan) Pat. Appln. No. 82108047. This invention implements two L-shaped pads and a thinner elastically deformable sheet provided between the pads, wherein the elastically deformable sheet is affixed with at least one strain gauge, such that upon simultaneous insertion of the two L-shaped pads and the elastically deformable sheet into an electrical connector, the elastically deformable sheet having a lower thickness is deformed while experiencing lateral pressure exerted by the connector terminals at one side thereof, so as to cause deformation of the strain gauge provided thereon. Because the strain gauge itself is a resistive component having resistance value being linearly dependent on length variation thereof, converting the resistance variation into electronic signals which are subsequently output to a signal amplifying device, allows one to obtain strain value of the strain gauge.

Prior to using this invention, a calibration instrument is utilized to obtain a calibration curve of load (positively-sensed force) vs. strain value and another calibration curve of displacement vs. strain value, such that upon insertion of this invention into the electrical connector, value of the positively-sensed force is obtainable by matching the strain value displayed in the signal amplifying device with the two calibration curves. Detailed structure of such a calibration instrument and calibration method thereof are disclosed in a co-pening patent application entitled "Micro Positively-sensed Force Calibration Instrument and Calibration Method" filed by the same Applicant.

The structure and advantages of this invention may be clearly understood by referring to the following illustrations and descriptions of preferred embodiments.

DETAILED EXPLANATIONS OF PREFERRED EMBODIMENTS

Figure 1:
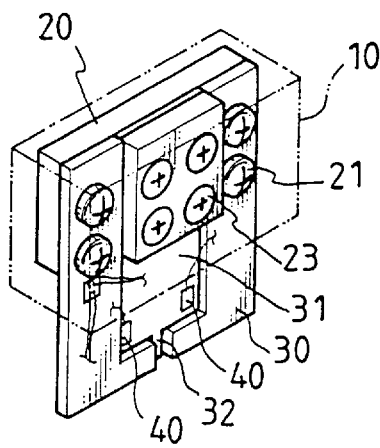
FIG. 1 illustrates an overall appearance of the apparatus for measuring positively-sensed force of an electrical connector according to this invention.

This invention relates to an apparatus for measuring positively-sensed force of an electrical connector. Preferred embodiments of this invention are described in detailed as follows. FIG. 1 illustrates an overall appearance of this invention, where elements for constructing this invention are illustrated in the exploded view of FIG. 2. This invention includes a housing 10 for receiving, retaining, and protecting precision devices, such as circuitry, and for easy handgrip of a user; a base plate 20; one or two L-shaped pads 30, the two L-shaped pads 30 being each connected to the base plate 20 by at least a set of fastening devices (such as the screws 21 as shown in this embodiment) at an upper end thereof, and the two L-shaped pads 30 being such arranged thatends thereof oppose each other. In this embodiment the two L-shaped pads 30 each have a thickness of approximately 1 mm. The two L-shaped pads 30 is further provided with an elastically deformable sheet 31 therebetween having a thickness being less than that of the two L-shaped pads (preferably of 0.6 mm to 0.8 mm) and accommodating an actual thickness of a circuit board as well as user's specifications. The elastically deformable sheet 31 has an upper end being affixed to the base plate 20 by a clamp 22 and a plurality of fastening devices (such as the screws 23 as shown in this embodiment). The elastically deformable sheet 31 has an end being formed with a narrow projective measuring region 32 (where the shape the measuring region is not limited to a rectangle as that shown in the drawings). The measuring region is dimensioned to accommodate the connector terminals and simulates shape of a golden finger of a conventional circuit board, into which this invention may be inserted to measure positively-sensed force that each terminal effects to the circuit board. The elastically deformable sheet 31 is provided with at least a strain gauge 40 that is located between the clamp 22 and the projective measuring region 32 and is connected to a signal transmitting device 40 for outputting strain signals being measured by the strain gauge to a signal amplifying device (not shown).

Description of Circuits

Figure 2:
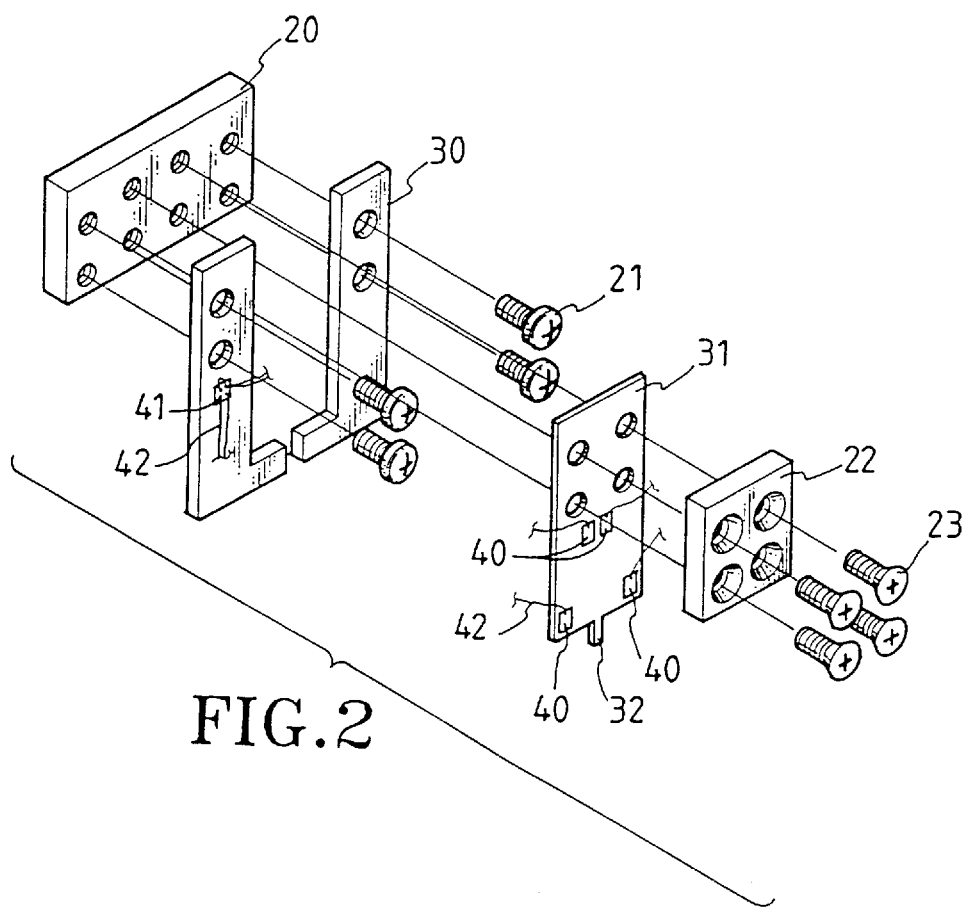
FIG. 2 is an exploded view of this invention.

In a preferred embodiment of this invention, as shown in FIG. 2, the elastically deformable sheet 31 is provided with four identical strain gauges 40, where each two strain gauges are juxtaposed and symmetrically arranged along a central axis of the elastically deformable sheet 31. Signal transmitting devices 42 of the four strain gauges 40 are serially connected at location 41 to form a Wheatstone Bridge Circuit that may provide accurate strain measurements of the elastically deformable sheet 31.

Description of Circuit Features

This invention is further characterized by where the four strain gauges are located, wherein two lower strain gauges neighbor bottom outer edges of the elastically deformable sheet 31 and two upper strain gauges neighbor the central axis of the elastically deformable sheet 31 and the clamp 22. Adoption of such an arrangement eliminates possible measurement errors resulted from different contact positions between connector terminals 51 and the projective measuring region 32. The concepts for arranging the gauges as described above may be obtained from Cantilever formula commonly adopted in material analysis in conjunction with Wheatstone Bridge Circuit of circuitry theory. Strain values of the elastically deformable sheet 31 are accurately measured because the voltage output measurements taken from the four serially connected strain gauges 40 are solely dependent on distance between the two upper strain gauges and the two lower strain gauges, but independent on the contact positions between connector terminals 51 and the projective measuring region 32. The efficacy of such a particular arrangement has been verified in actual measurement experiments.

Description of Concepts

Figure 3:
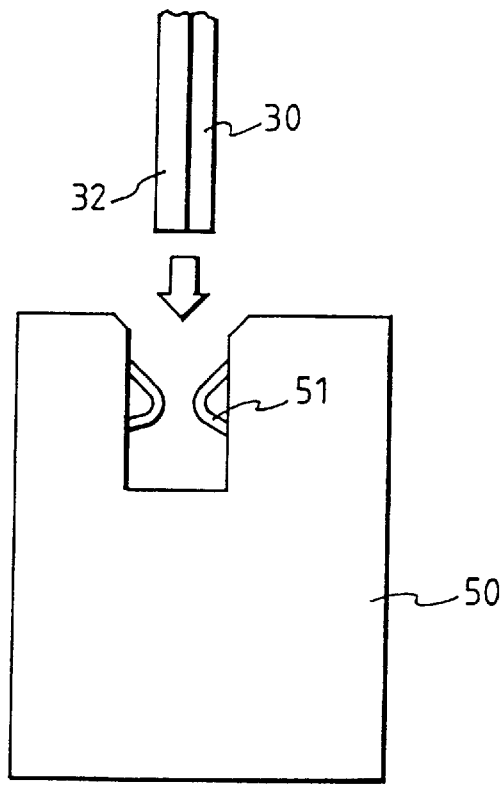
FIG. 3 is a partial enlargement view illustrating the projective measuring regions locating at an end of each L-shaped pad and the elastically deformable sheet of this invention, prior to being inserted into an electrical connector.
Figure 4:
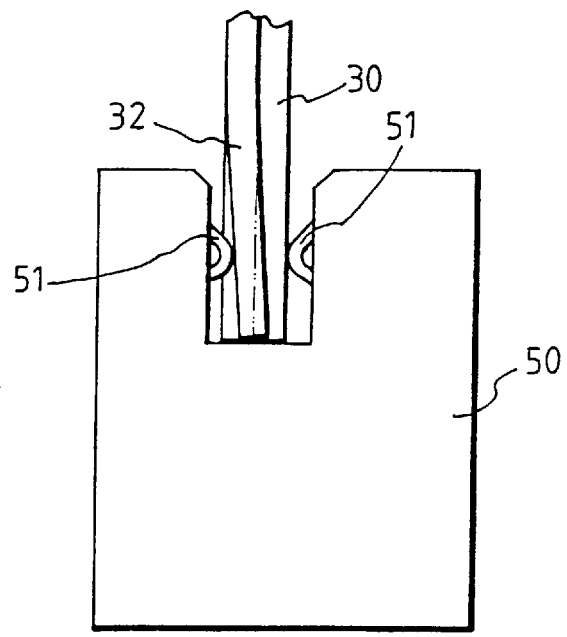
FIG. 4 is a partial enlargement view illustrating the projective measuring regions locating at an end of each L-shaped pad and the elastically deformable sheet of this invention, after being inserted into an electrical connector.

FIGS. 3 and 4 are partial enlargement views of this invention, prior to and after being inserted into an electrical connector, respectively. Prior to inserting this invention into the electrical connector, the elastically deformable sheet 31 and the projective measuring region 32 thereof are parallel to the two L-shaped pads 30. Because the elastically deformable sheet 31 is thinner, only a side of the projective measuring region 32 is flush with the two L-shaped pads 30. Upon insertion of this invention into a base 50 of the electrical connector, the projective measuring region 32 is inserted between terminals 51 of the electrical connector. Because the two L-shaped pads 30 are of a higher thickness, and because the elastically deformable sheet 31 has a thickness not only being less than that of the two L-shaped pads 30, but also being less than a transverse gap formed between the connector terminals 51 under test, only one side of the elastically deformable sheet 31 is in contact with the terminal 51, and the elastically deformable sheet 31 (that is, the projective measuring region 32) is thus deformed while experiencing lateral pressure exerted by the connector terminal 51. In FIG. 4, strain values of the projective measuring region 33 and the connector terminals 51 are exaggerated for purpose of illustration, where the strain values are measured by the strain gauges 40 and output to a signal amplifying device (not shown) via the signal transmitting devices 42.

Description of Additional Technical Implementation

Prior to using this invention, a calibration instrument is utilized to measure a first calibration curve of load (positively-sensed force) vs. strain value and a second calibration curve of displacement vs. strain value, (where such two calibration curves are usually linear). Because the terminals 51 will also be displaced while experiencing pressure upon insertion of this invention into the electrical connector 51, measurement errors resulted from the displacement can thus be restored from the calibration curve of displacement vs. strain value. Hence, upon insertion of this invention into the electrical connector, value of the positively-sensed force is obtainable by matching the strain values of the strain gauges 40 displayed in the signal amplifying device with the two calibration curves. In addition, in order to obtain precise measurements, in a preferred embodiment of this invention, the elastically deformable sheet 31 is made of relatively rigid materials such that most displacement occurs at the terminals 51 of the electrical connector, rather than occurring at the elastically deformable sheet 31 upon insertion of this invention thereby further reducing measurement errors.

Not only can this invention measure positively-sensed clamping force of the connector terminals effecting to the circuit board and the displacement of the connector terminals under pressure, it can be used as a basis for verifying results of finite elements analysis currently being adopted for acquiring positively-sensed force, whereby reliable techniques for analyzing positively-sensed force of electrical connectors may be established so as to assist manufactures of electrical connectors in engineering new products or in improving currently available products. This invention not only enhances product reliability, but also promotes further development of electrical connectors of higher precision.

This invention is related to a novel device that makes breakthroughs in conventional art. Aforementioned explanations are directed to the descriptions of preferred embodiments according to the present invention. Various changes and implementations can be made by those skilled in the art without departing from the technical concepts of the present invention. Such changes to certain features of the preferred embodiments without altering the overall basic functions of the invention are contemplated by and included in the scope of the appended claims.

What is claimed is:

1. An apparatus for measuring positively-sensed force of an electrical connector, comprising:
    a base plate;
    at least one L-shaped pad being connected to the base plate at an upper end thereof with a horizontal section of the L-shaped pad pointing to a middle of the apparatus;
    an elastically deformable sheet provided beside the L-shaped pad and having an upper end being affixed to the base plate and having a lower end being formed with a projective measuring region; and further wherein the L-shaped pad and the projective measuring region being insertable between terminals of the electrical connector; and
    at least one strain gauge being inertly affixed to the elastically deformable sheet and being connected to a signal transmitting device for outputting signals.

2. The apparatus for measuring positively-sensed force of an electrical connector as set forth in claim 1, wherein the elastically deformable sheet is provided with two or more than two strain gauges of an even number, each two strain gauges being juxtaposed and symmetrically arranged along a central axis of the elastically deformable sheet.

3. The apparatus for measuring positively-sensed force of an electrical connector as set forth in claim 1, wherein the elastically deformable sheet is affixed to the base plate by a clamp and a plurality of fastening devices that are located above the strain gauge, that is, the strain gauge being located between the clamp and the projective measuring region.

4. The apparatus for measuring positively-sensed force of an electrical connector as set forth in claim 1, further comprising a housing for covering the base plate, and an upper portion of the L-shaped pad and the elastically deforamble sheet.

5. The apparatus for measuring positively-sensed force of an electrical connector as set forth in claim 1, wherein the L-shaped pad has a thickness being not greater than a thickness of an article into which the apparatus is to be inserted.

6. The apparatus for measuring positively-sensed force of an electrical connector as set forth in claim 1, wherein the elastically deforamble sheet has a thickness being less than the thickness of the L-shaped pad and less than a transverse gap formed between terminals of an electrical connector.

7. The apparatus for measuring positively-sensed force of an electrical connector as set forth in claim 2, wherein the elastically deformable sheet is provided with four strain gauges which include two lower strain gauges neighboring bottom outer edges of the elastically deformable sheet and two upper strain gauges neighboring the central axis of the elastically deformable sheet and the clamp.

8. The apparatus for measuring positively-sensed force of an electrical connector as set forth in claim 7, wherein the four strain gauges are serially connected to form a Wheatstone Bridge Circuit.

* * * * *